United States Patent [19]
Sneath

[11] 3,922,360
[45] Nov. 25, 1975

[54] SIMULATED SOFT FRUITS
[75] Inventor: Michael Edwin Sneath, Wellingborough, England
[73] Assignee: Lever Brothers Company, New York, N.Y.
[22] Filed: Jan. 23, 1974
[21] Appl. No.: 435,787

[30] Foreign Application Priority Data
Jan. 23, 1973 United Kingdom............... 3334/73

[52] U.S. Cl. .............. 426/573; 426/577; 426/803; 426/515; 426/89; 426/276
[51] Int. Cl.² .......................................... A23L 1/06
[58] Field of Search .......... 426/167, 168, 169, 170, 426/350, 803

[56] References Cited
UNITED STATES PATENTS
2,992,925   7/1961   Green ............................ 426/167
3,682,654   8/1972   Johnson ........................... 426/170

*Primary Examiner*—Jeanette M. Hunter
*Attorney, Agent, or Firm*—James J. Farrell, Esq.

[57] ABSTRACT

In an encapsulation process, particularly for preparing simulated soft fruit, drops are formed by extrusion and simultaneously coated with alginate or pectate sol. The coated drops are treated in a setting bath of calcium ions. Calcium ions inside the drops also aid setting of the coating. Better defined skins and less tendency to stick together are found than with other known processes of coating drops using calcium ions both inside and outside to set the coating gel.

1 Claim, 1 Drawing Figure

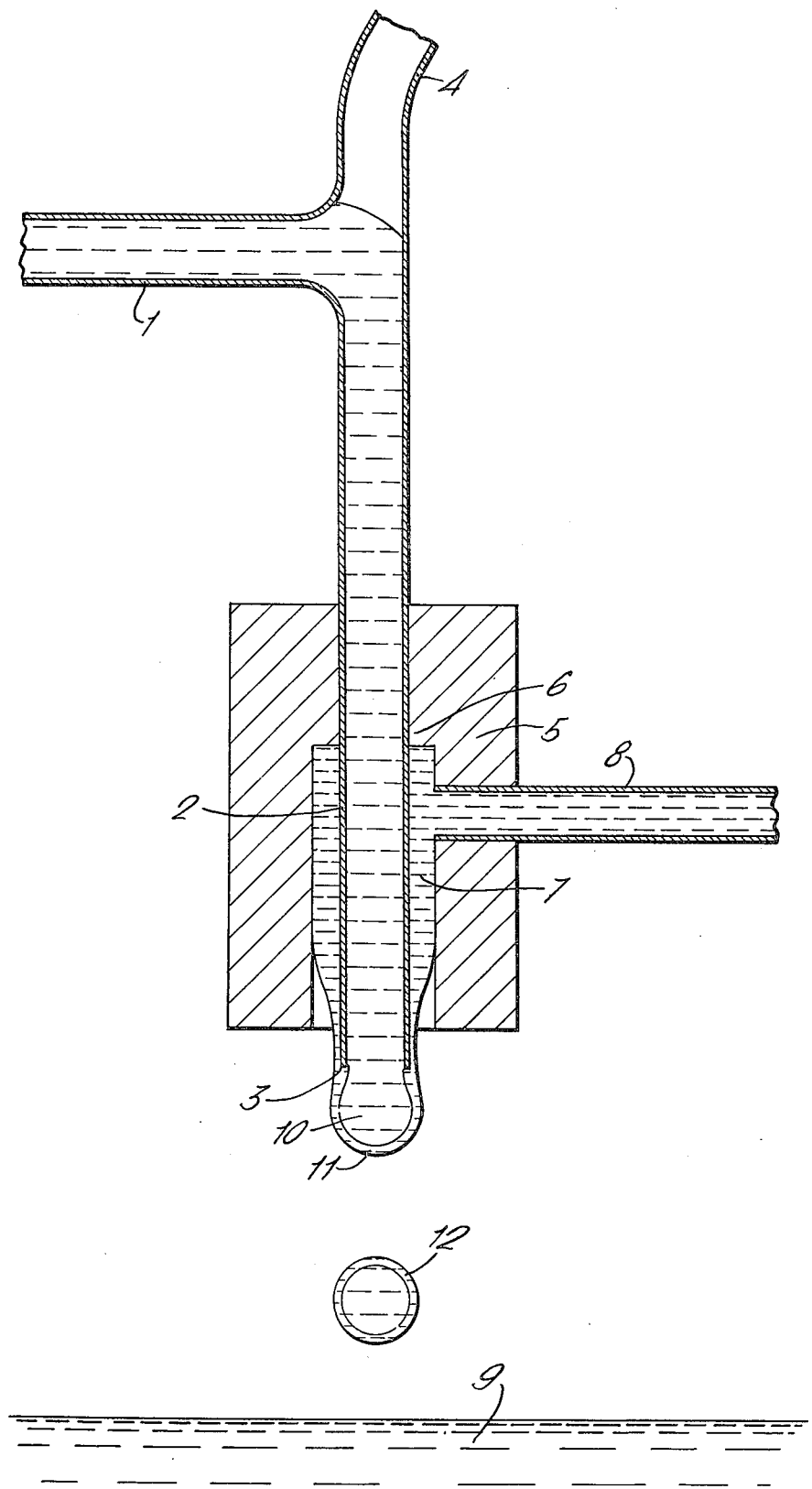

SIMULATED SOFT FRUITS

BACKGROUND TO INVENTION

This invention relates to a process for preparing simulated soft fruit such as blackcurrants, redcurrants, blueberries and bilberries in which a relatively tough skin surrounds a liquid or at least a substantially liquid interior. Simulated fruit are important as economic and convenient substitutes for natural fruit. Their preparation is also a useful outlet for waste products from other processes using fruit. Simulated fruit can be used in many products for instance in dairy products such as yoghurt and ice cream, in jam, in flans and in pies. It is important to have processes capable of producing simulated fruit on a large scale otherwise possible economic advantages will not be realised.

PRIOR ART

Many publications discuss the possible use of alginate or pectate gels to form simulated fruits. Examples are Peschardt U.S. Pat. No. 2,403,547 and copending Wood Application Ser. No. 195,830. G.B. No. 1,302,275 and Johnson U.S. Pat. No. 3,682,654 describe methods of preparing soft fruit. In these processes drops containing calcium ions are dropped into a bath of alginate or pectate sol. The calcium ions produce a skin of calcium alginate or pectate by diffusion from inside the drops into the surrounding alginate or pectate sol. The coated drops are then given a post-hardening by being treated in a bath of calcium ion. The processes have the advantage over Peschardt that the skin is appreciably better defined but nevertheless the processes have distinct disadvantages that militate against their use on a commercial scale. In particular there is a tendency for the drops to stick together in the bath of alginate or pectate sol.

THE INVENTION

It has now been found that an improved product is formed by extruding fruit pulp, puree or juice containing dissolved calcium or aluminum ions in the form of drops, coating the drops with an alginate or pectate sol as they are extruded and treating the exteriors of the coated drops so formed with dissolved calcium or aluminum ions. This use of calcium or aluminum ions to gel the alginate or pectate layer from the inside and from the outside concomitantly tends to give a skin that is both better defined and more firmly set than the skin produced by the processes described in U.S. Pat. No. 3,682,654 or G.B. No. 1,302,275. Also in the present process the products formed are less likely to stick together than in these processes. These advantages occur with such a process when any liquid containing calcium or aluminum is encapsulated using alginate or pectate.

The present invention therefore provides an encapsulating process in which drops of a liquid containing dissolved calcium or aluminum ions are coated with an alginate or pectate sol as the drops are formed and the exteriors of the coated drops are treated with a solution containing dissolved calcium or aluminum ions. The coated drops are preferably dropped or thrown into a bath of the solution containing dissolved calcium or aluminum ions and preferably this occurs immediately after formation of the drops.

The drops can be formed in any convenient manner. An example of one suitable method is for instance described in U.S. Pat. No. 3,015,128. Another preferred method is to coextrude the alginate or pectate sol and the liquid containing dissolved calcium or aluminum ions: the liquid is extruded through an inner tube; the sol is extruded through an outer tube. The tubes should preferably be coaxial although at least the outer tube need not be circular in cross-section.

In a preferred form of the invention the liquid contains fruit pulp or puree as well as calcium or aluminum ions. Suitable fruit materials include the pulp or puree of blackcurrants, strawberries, apples, pears and peaches. The puree can be a fruit juice thickened to a viscosity that corresponds to the texture desired for the interior of the fruit. The fruit pulp or puree, particularly relatively bland material such as apple, can have additional flavouring incorporated in it; the flavouring need not necessarily correspond to the fruit of the pulp or puree itself.

The calcium or aluminum ions can be provided by any edible, soluble calcium or aluminum salt, for instance calcium chloride. Calcium salts are preferred. Preferred calcium salts are calcium lactate, citrate, gluconate, and acetate. Preferred concentrations of calcium or aluminum salt are 0.1 to 2%, particularly 0.3 to 0.7%, by weight in the inner liquid and 1 to 10%, particularly 4 to 7%, in the solution used to treat the exterior of the product. The length of time in the setting bath depends on the calcium ion concentration but should preferably be greater than 0.5 min; times of 1 min. to 7 min. are convenient.

The skin of alginate or pectate gel can behave as a semi-permeable membrane and when the product is stored in an aqueous environment low in dissolved salts it tends to absorb water and swell. On swelling it develops a texture which with regard to the sensation it gives on being bitten into very much resembles that resulting from the turgor pressure of natural fruit.

The alginate or pectate sol employed is suitably one based on an alkali metal alginate or pectate for example sodium alginate, ammonium alginate or sodium pectate. The preferred concentration of alginate or pectate in the sol is 1 to 4% particularly 1.5 to 2.5%, by weight.

The presence of too watery a texture in the interior of simulated fruit prepared by a process according to the invention can be avoided by including in the fruit material to be encapsulated a thickener such as carboxy methyl cellulose or a pre-gelatinised starch or a thickener such as a cross-linked starch whose thickening properties develop only after it has been heated, as in canning or pasteurising.

The accompanying drawing is a diagram of a form of apparatus suitable for preparing products according to the invention.

A supply pipe 1 leads from a reservoir (not shown) for the liquid to be encapsulated and is connected to a tube 2 terminating in outlet 3. An air line 4 from a pulse inducer is also connected to the tube 2. The tube 2 is surrounded by a jacket 5 whose upper end 6 fits tightly around the tube. A chamber 7 is thus defined between the tube 2 and the jacket 5. A pipe 8 connected to a supply of alginate sol (now shown) passes through the jacket 5 and leads into the chamber 7. The outlet 3 of the tube 2 is situated somewhat below the bottom of the jacket 5. The tube and jacket are positioned above a bath 9 containing a dissolved calcium or aluminum salt. The tube 2 is preferably held firmly and centrally within the chamber 7 so that a uniform layer of the sol can be extruded. One method of holding the tube centrally is by, in cross-section, point contact at at least three points near the extrusion head between the block 6 and the tube 2.

In use for instance fruit material containing dissolved calcium ions is pumped smoothly through the supply pipe 1 to the tube 2. A pulsating air pressure is supplied to the tube 2 via air line 4. This pulsating effect is not essential for the carrying out of the invention, but it enables the more rapid formation and extrusion of drops at the outlet 3. An alginate or a pectate sol is supplied to the chamber 7 through the pipe 8. As each drop 10 of fruit material forms at the outlet 3 it becomes enveloped in a coating 11 of sol. Gelation by the calcium ions contained in the fruit material commences at the interface of the fruit material and the coating thereby forming a calcium alginate or pectate membrane which helps to hold the drop in shape. As the drop is expelled from the outlet 3 the coating 11 envelopes the drop completely to form an intermediate product 12 which has a core of fruit material containing dissolved calcium ions, a sticky exterior of sol and a membrane of calcium gel at the interface of the fruit material and the sol. This intermediate product 12 drops into the bath containing the solution dissolved calcium salt 9 where gelation of the sol by the calcium ions contained in the fruit material continues and gelation by the calcium ions in the bath commences. To mitigate any slight tendency for the drops to stick together and to provide a continuous process, the solution of dissolved calcium salt is preferably flowing through the bath. Splashing from the bath can damage falling drops. This can be avoided by sloping the surface of the bath or by foaming the surface of the bath as described in U.K. patent application No. 59208/73.

The tube 2 preferably has a diameter of 3–10 mm and the width of the annular gap between tube 2 and jacket 5 is preferably 1–3 mm. Usually the skin formed on the product will be about 1 mm thick. The sol tends to coat the tube 2 around the outlet 3 and unless it is supplied to the chamber 7 under high pressure the skin is generally thinner than the annular width of chamber 7. The tube 2 is preferably positioned with its outlet 3 about 5 to 20 cms, particularly 8 to 13 cms, above the bath 9.

The invention is illustrated by the following example.

EXAMPLE

A blackcurrant pulp mix containing calcium ions was prepared by mixing together the following ingredients:

|  | % by weight |
|---|---|
| Blackcurrant pulp | 41.1 |
| Water | 42.8 |
| Calcium lactate | 1.0 |
| Citric acid | 0.2 |
| Sugar | 12.7 |
| Cross linked farina | 1.7 |
| Carboxymethyl cellulose | 0.5 |

An alginate sol containing 2% by weight of sodium alginate was separately prepared.

The above ingredients were fed to the apparatus illustrated in the drawing. The blackcurrant pulp mix was pumped along supply line 1 at a rate of 3 kg per hour and the alginate sol was pumped along supply line 8 at 1 kg per hour. The pneumatic pulsator attached to air line 4 was set to operate at 160 pulses per minute. The apparatus used had a tube 2 with an extrusion outlet 3 of 5 mm diameter and a jacket 5 with an inner diameter of 9 mm (corresponding to an annular width for the chamber 7 of 2 mm). The bath 9 contained a 3% by weight aqueous solution of calcium lactate.

Drops of balckcurrant pulp coated with alginate sol were extruded from the outlet 3 at a rate of 160 per minute. They were left immersed in the bath 9 for 5 minutes after which time the exterior was firm and had lost the stickiness characteristic of an alginate sol. The products could be easily handled without breaking. When canned in an aqueous syrup and sterilised at 100°C for 30 minutes the simulated blackcurrants formed had a texture remarkably similar to that of real cooked blackcurrants.

What is claimed is:

1. A process for preparing simulated soft fruit consisting essentially of
    a. extruding fruit pulp, puree or juice containing, by weight, from about 0.1 to about 2% of dissolved edible, soluble calcium salt to form drops;
    b. simultaneously coating the drops with a thin skin of alginate or pectate sol as said drops are formed by extrusion, said sol containing, by weight, from about 1 to about 4% of alginate or pectate
    c. dropping or throwing the coated drops into an aqueous setting bath containing from about 1 to about 10% of dissolved edible, soluble calcium salt; and
    d. allowing the thin skin of sol to gel by maintaining the drops in the aqueous setting bath for at least 1 min.

* * * * *